Dec. 19, 1933.  B. E. LUBOSHEZ  1,939,785
COLOR PHOTOGRAPHY WITH LARGE APERTURE LENSES
Filed Dec. 22, 1930
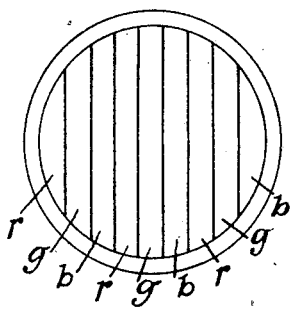
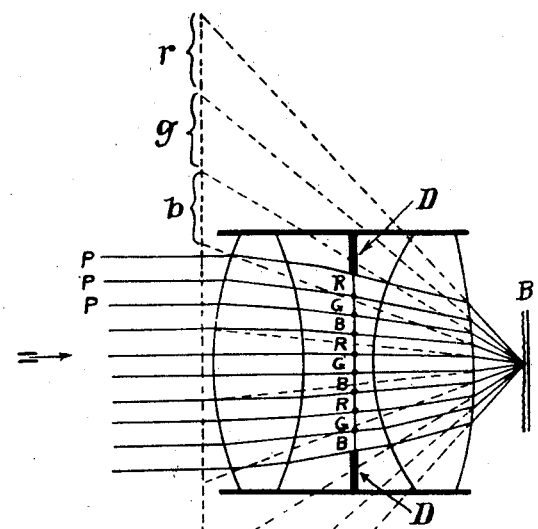
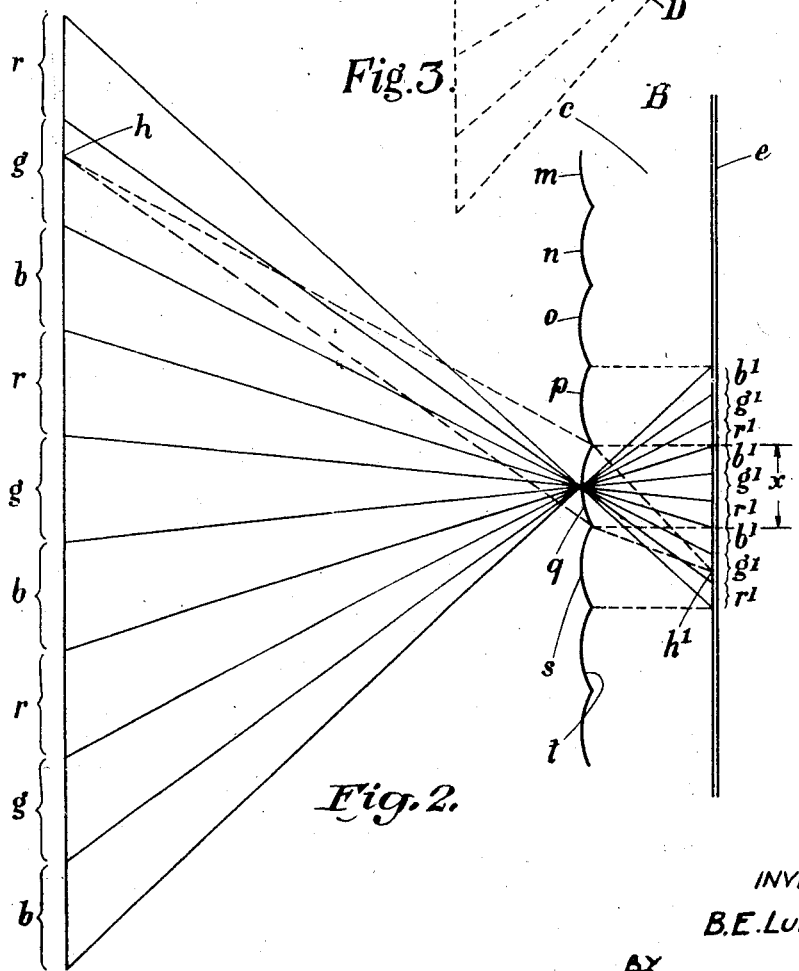
INVENTOR
B.E. LUBOSHEZ
ATTORNEY Patented Dec. 19, 1933

1,939,785

UNITED STATES PATENT OFFICE 1,939,785

COLOR PHOTOGRAPHY WITH LARGE APERTURE LENSES

Benjamin Elian Luboshez, Harrow, England

Application December 22, 1930, Serial No. 503,868, and in Great Britain December 23, 1929

1 Claim. (Cl. 95—2)

It is known, in color photography with lenticular films, that a fixed relation exists between relative aperture of taking lens, curvature of film embossings, and thickness of film support in order that an image of the color screen may be focussed on the emulsion lying behind each embossed element. These embossed elements are usually in the form of cylindrical lenses, which in the case of cinematograph film, run lengthways.

In the usual manner of using such films, the above factors are so related that the total width of the image of the three color bands of the filter is substantially equal to the width of each cylindrical element of the film base; this fixed relationship between the relative aperture of the lens and the elements of the film prevents any overlapping of the images produced by one cylindrical element with the images produced by its neighbors, any increase in the relative aperture of the taking lens and consequently in the width of the color bands of the filter, causing this overlapping to take place.

The object of the present invention is to enable the use of lenses of larger aperture than that for which the film embossing was designed. In carrying the invention into effect the images are arranged to overlap, but in such a way that they coincide accurately with each other, red coinciding with red, green with green and blue with blue. This is realized, according to the invention, by subdividing the color bands in the filter so as to obtain a series of groups of color bands, the colors in all the groups being arranged in the same order and the width of a group (or set of groups) being arranged to subtend the same angle at the film as the ordinary filter does with its appropriate lens of an aperture for which the film was designed.

For example, embossed films designed for use with an $f/2$ lens can be used with an $f/0.67$ lens by substituting for the usual three-band filter one comprising three sets of three color bands arranged to fill the lens opening, because an $f/0.67$ lens would have a diameter practically three times as great as an $f/2$ lens of equal focal length.

A filter of this kind is shown in Fig. 1 where $r$, $g$, $b$, represent the red, green and blue bands respectively. Fig. 2 is a diagram showing the paths of light from the objective lens (not shown) after passing through such a filter. Fig. 3 is a diagram showing the objective lens, the filter in the diaphragm D, and the path of the light rays through the lens and filter to the film B, the unbroken lines showing the true path and the broken lines showing the apparent path.

A represents the filter and B the film with a greatly magnified thickness, C being the celluloid base composed of lenticular elements $m$—$t$ designed for an $f/2$ lens, and $e$ the emulsion. It will be observed that each of the color bands of the filter A is of the same width as the bands on a filter for an $f/2$ lens, the lenticular element $q$ producing on the emulsion an image of the centre group of filter bands extending over the width $x$ of the element in the normal way. The images of the outer groups of filter bands are produced by the element $q$ behind the neighboring elements $p$ and $s$, the image of any point $h$ for example, in a green band being produced by $q$ at $h'$ behind element $s$. These images coincide with the images of the centre group of bands produced by the elements $p$ and $s$. Similarly the elements $p$ and $s$ each produce behind $q$ an image of an outer group of bands. Thus every portion of the emulsion $e$ receives light from three neighboring lenticular elements, each element producing at $r$, $b$, $g'$ a complete image of the filter A.

The films taken in this way could be projected either through a lens working at $f/2$ with its appropriate filter or through a lens working at $f/0.67$ fitted with the filter comprising the three sets of color bands.

The above described arrangement is only possible with a lens of three times the aperture of the one for which the lenticular elements were designed, but it will be apparent that the result will not be effected if the color bands are half the width or any narrower width so long as a whole number of groups embrace the width of filter which would be necessary for the lens for which the film was designed, thus affording an image of these groups of the width $x$. This, therefore, is the method which is employed when using any other ratio of aperture to lenticular element. For example, lenticular films designed for use with an $f/2$ lens can be used with an $f/1$ lens by substituting for the ordinary three band filter one composed of four sets of three color bands arranged to fill the lens opening, i. e. bands of half the width. In this case each cylindrical element would give an image of the four sets of color bands which would have a width of two elements, the image from each element being spread over the area immediately behind it and over one half of each of the neighboring elements. In this way every part of the film would receive light from two of the cylindrical elements.

Pictures taken in this manner could be projected either through an $f/1$ lens having a similar filter to that on the taking lens, or through an f/2 lens and a filter having bands of the same width, i. e. comprising two sets of three color bands.

It will be seen from the foregoing that the principle of overlapping images enables lenses of any desired aperture to be used for color photography with lenticular films; because with each choice for the fundamental dimensions of the cylindrical lens elements, suitably sub-divided filters can be determined.

What I claim as my invention and desire to secure by Letters Patent is:—

In color photography, the combination with a lenticular film of an objective lens having an aperture of such diameter that its image on the film emulsion produced by a lenticular element is wider than the said element, a color filter in association with said aperture having a plurality of groups of color bands virtually filling the aperture, each of such width that an image of a whole number of them equal in width to a lenticular element is formed on the emulsion by the lenticular elements, and with their colors in the same order whereby the images of individual color bands are coincident in the overlapping portions of the images on the emulsion.

BENJAMIN ELLAN LUBOSHEZ.